United States Patent
Kato et al.

(10) Patent No.: US 9,261,005 B2
(45) Date of Patent: Feb. 16, 2016

(54) EXHAUST GAS HEAT RECOVERY DEVICE

(71) Applicant: FUTABA INDUSTRIAL CO., LTD., Okazaki-shi, Aichi (JP)

(72) Inventors: Hisayuki Kato, Okazaki (JP); Hirohisa Okami, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 0 days.

(21) Appl. No.: 14/367,850

(22) PCT Filed: Dec. 14, 2012

(86) PCT No.: PCT/JP2012/082534
§ 371 (c)(1),
(2) Date: Jun. 20, 2014

(87) PCT Pub. No.: WO2013/094539
PCT Pub. Date: Jun. 27, 2013

(65) Prior Publication Data
US 2014/0352286 A1    Dec. 4, 2014

(30) Foreign Application Priority Data

Dec. 22, 2011 (JP) ................................. 2011-281468

(51) Int. Cl.
*F01N 3/02* (2006.01)
*F01N 5/02* (2006.01)
(Continued)

(52) U.S. Cl.
CPC ................. *F01N 5/02* (2013.01); *F02M 25/07* (2013.01); *F28D 9/0012* (2013.01);
(Continued)

(58) Field of Classification Search
CPC ....... F01N 5/02; F01N 2240/02; F01N 3/043; F01N 13/14; F01P 2606/16
USPC ............................. 60/288, 285, 284, 286, 320
See application file for complete search history.

(56) References Cited

U.S. PATENT DOCUMENTS 5,033,264 A * 7/1991 Cabral ............................ 60/274
6,702,190 B1 * 3/2004 Nohl et al. ............... 237/12.3 C
(Continued)

FOREIGN PATENT DOCUMENTS

DE       4308858 A1 *  9/1994  ................ F28F 3/02
DE    102004023711 B3 * 10/2005
(Continued)

OTHER PUBLICATIONS

English translation of International Preliminary Report on Patentability under Chapter I PCT (Form PCT/IB/373) dated Jun. 24, 2014 for PCT/JP2012/082534 including English translation of Written Opinion (Form PCT/ISA/237) (6 pages total).
(Continued)

*Primary Examiner* — Patrick Maines
(74) *Attorney, Agent, or Firm* — Withrow & Terranova, P.L.L.C.; Vincent K. Gustafson (57) ABSTRACT

An exhaust gas heat recovery device of the present invention recovers heat of an exhaust gas from an internal combustion engine. The exhaust gas heat recovery device includes an exhaust pipe that leads the exhaust gas from an upstream side to a downstream side, a cylindrical shell that covers an outside of the exhaust pipe, and an exhaust gas heat recovery section that is interposed between the exhaust pipe and the cylindrical shell and that performs heat exchange between the exhaust gas and a heat exchange medium. The exhaust gas heat recovery section includes a stacked body that is composed by stacking a plurality of jacket each having a heat exchange medium conduit provided thereinside. In the stacked body, the respective heat exchange medium conduits in the plurality of jacket parts are serially connected to each other.

5 Claims, 6 Drawing Sheets

(51) Int. Cl.
  *F28F 27/00* (2006.01)
  *F02M 25/07* (2006.01)
  *F28D 9/00* (2006.01)
  *F28D 21/00* (2006.01)

(52) U.S. Cl.
  CPC ......... *F28D 9/0043* (2013.01); *F28D 21/0003* (2013.01); *F28F 27/00* (2013.01); *F01N 2240/02* (2013.01); *Y02T 10/16* (2013.01)

(56) References Cited

U.S. PATENT DOCUMENTS

| | | | |
|---|---|---|---|
| 2009/0038302 A1* | 2/2009 | Yamada et al. | 60/320 |
| 2010/0251702 A1 | 10/2010 | Shikazono et al. | |
| 2011/0131961 A1* | 6/2011 | Lee et al. | 60/320 |
| 2013/0112371 A1* | 5/2013 | Koo et al. | 165/103 |

FOREIGN PATENT DOCUMENTS

| | | | | |
|---|---|---|---|---|
| DE | 102006029854 A1 * | 1/2008 | | |
| DE | 202008011266 U1 * | 12/2009 | | F24H 1/43 |
| EP | 1746361 A1 * | 1/2007 | | F24H 1/43 |
| JP | S62-112473 U | 7/1987 | | |
| JP | 2001-073874 A | 3/2001 | | |
| JP | 2008-025380 A | 2/2008 | | |
| JP | 2009-114995 A | 5/2009 | | |
| JP | 2009-144606 A | 7/2009 | | |
| JP | 2010-002094 A | 1/2010 | | |

OTHER PUBLICATIONS

Notice of Reasons for Rejection for Japanese Patent Application No. 2011-281468, mailed Nov. 11, 2014, 5 pages.
International Search Report for International Patent Application No. PCT/JP2012/082534 (Form PCT/ISA/210), mailed Mar. 5, 2013.
Patent Examination Report 1 dated May 25, 2015 for Australian Patent Application No. 2012354853 (3 pages total).
English translation of claim 1 of Japanese Utility Model Application Publication No. S62-112473 (Jul. 17, 1987) (1 page total).
Office Action dated Jul. 7, 2015 for Canadian Patent Application No. 2,859,624 (3 pages total).
Office Action (Notification of Preliminary Rejection) in Korean Patent Application No. 10-2014-7019594 dated Oct. 20, 2015.
Office Action (Notification of the First Office Action) for Chinese Patent Application No. 201280062272.3 dated Oct. 12, 2015 with English Translation (11 pages total).
Office Action for Russian Patent Application No. 2014130020 dated Oct. 30, 2015 with English Translation (10 pages total).

* cited by examiner

EXHAUST GAS HEAT RECOVERY DEVICE

CROSS-REFERENCE TO RELATED APPLICATIONS

This application is a 35 U.S.C. §371 national phase filing of International Application No. PCT/JP2012/082534, filed Dec. 14, 2012, and claims the benefit of Japanese Patent Application No. 2011-281468 filed Dec. 22, 2011 in the Japan Patent Office. The entire disclosures of International Application No. PCT/JP2012/082534 and of Japanese Patent Application No. 2011-281468 are hereby incorporated by reference herein in their respective entireties.

TECHNICAL FIELD

The present invention relates to an exhaust gas heat recovery device interposed in an exhaust-gas flow path from an internal combustion engine, which device recovers exhaust gas heat by performing heat exchange between exhaust gas and a heat exchange medium.

BACKGROUND ART

As described in Patent Document 1, there is a well-known device interposed in an exhaust-gas flow path, which device recovers exhaust gas heat by performing heat exchange between the exhaust gas from an internal combustion engine and a heat exchange medium, such as cooling water of the internal combustion engine and the like. In this device, a tube stacked body is composed by stacking a plurality of flattened tubes having a circular torus shape, an exhaust pipe is inserted into the tube stacked body, and a cylindrical case is disposed on an outside of the tube stacked body. Further, in this device, there is provided, in the exhaust pipe, a shutoff valve that shuts off the exhaust gas flowing out from the exhaust pipe. When the internal combustion engine is being warmed up, the shutoff valve is closed. According to such configuration, the exhaust gas is led into a space between the cylindrical case and the tube stacked body during warming-up, and then, led into a space between the flattened tubes, and delivered to an opposite space between the cylindrical case and the tube stacked body. After that, the exhaust gas is discharged downstream of the exhaust-gas flow path from the opposite space between the cylindrical case and the tube stacked body. Further, the flow paths formed inside of the respective flattened tubes are connected in parallel to each other, and by flowing the heat exchange medium through the connected flow paths, heat exchange is performed between the exhaust gas and the heat exchange medium.

PRIOR ART DOCUMENTS

Patent Documents

Patent Document 1: Japanese Unexamined Patent Application Publication No. 2009-114995

SUMMARY OF THE INVENTION

Problems to be Solved by the Invention

However, in such conventional devices, resistances in the respective flow paths vary from each other since the flow paths in the respective flattened tubes are connected in parallel to each other. Thus, the heat exchange medium may flow through only some particular flow paths. For example, in a case that much of the heat exchange medium flows through some of the short flow paths provided in parallel, the heat exchange is not adequately performed. Meanwhile, the exhaust gas firstly flows through the space between the cylindrical case and the tube stacked body, and then flows through the space between the flattened tubes. Therefore, heat is released from the exhaust gas having a high temperature via the cylindrical case to the atmosphere, whereby a temperature of the exhaust gas is lowered before performing the heat exchange between the exhaust gas and the heat exchange medium. Therefore, a recovery loss of a heat amount occurs.

In one aspect of the present invention, there is provided an exhaust gas heat recovery device in which improvement in efficiency of recovering exhaust gas heat is attempted.

Means for Solving the Problems

An exhaust gas heat recovery device of the present invention recovers heat of an exhaust gas from an internal combustion engine and includes an exhaust pipe that leads the exhaust gas from an upstream side to a downstream side, a cylindrical shell that covers an outside of the exhaust pipe, and an exhaust gas heat recovery section that is interposed between the exhaust pipe and the cylindrical shell and that performs heat exchange between the exhaust gas and a heat exchange medium.

The exhaust gas heat recovery section includes a stacked body that is composed by stacking a plurality of jacket parts each having a heat exchange medium conduit provided thereinside. In the stacked body, the respective heat exchange medium conduits in the plurality of jacket parts are serially connected to each other. A first clearance, through which the exhaust gas from the exhaust pipe passes, is provided between an outer circumference of the exhaust pipe and the stacked body. A second clearance, through which the exhaust gas having passed through the first clearance passes, is provided between the plurality of jacket parts constituting the stacked body. A third clearance, through which the exhaust gas having passed through the second clearance passes, is provided between an inner circumference of the cylindrical shell and the stacked body.

In the exhaust gas heat recovery device of the present invention, each of the plurality of jacket parts may have a flattened and arc-like shape.

The exhaust gas heat recovery device having such configuration may further include an end part having a heat exchange medium conduit of a ring shape provided thereinside. Each of the plurality of jacket parts may have a substantially half-arc-like shape, and the stacked body composed by stacking the plurality of jacket parts may be provided two in number as jacket part assemblies. In such configuration of the exhaust gas heat recovery device, the two jacket part assemblies may be disposed on the end part, such that the two jacket part assemblies face each other, and the respective heat exchange medium conduits in the two jacket part assemblies may be serially connected to each other via the heat exchange medium conduit in the end part.

In the exhaust gas heat recovery device of the present invention, each of the plurality of jacket parts may have two half-bodies, and the heat exchange medium conduit may be provided inside of each of the plurality of jacket parts by abutting the two half-bodies to each other. One of the two half-bodies may have an inflow opening provided at an end thereof, and the other of the two half-bodies may have an outflow opening provided at an end thereof, which is positioned opposite to the end at which the inflow opening is provided.

The exhaust gas heat recovery device of the present invention may further include a diversion valve that leads the exhaust gas to the exhaust gas heat recovery section when the internal combustion engine is being warmed up. The diversion valve may include a valving element having a dome-like shape, and the exhaust gas flowing out from the exhaust pipe is hit against the valving element and led into the first clearance between the outer circumference of the exhaust pipe and the stacked body.

Effects of the Invention

In the exhaust gas heat recovery device of the present invention, the respective heat exchange medium conduits in the plurality of the jacket parts are serially connected to each other, whereby the heat exchange medium flows through one long heat exchange medium conduit as a whole flow path. Therefore, heat exchange is performed between the heat exchange medium and the exhaust gas each time the heat exchange medium flows through the heat exchange medium conduit in each of the jacket parts. Thus, exhaust gas heat is adequately recovered and a temperature of the heat exchange medium increases in a short time, whereby improving efficiency in recovering the exhaust gas heat.

Further, the exhaust gas having a high temperature from the exhaust pipe flows into the clearance (the first clearance) between the outer circumference of the exhaust pipe and the stacked body. Therefore, it is possible to inhibit the exhaust gas heat from being released to the atmosphere, whereby a recovery loss of an exhaust gas heat amount to be recovered can be decreased. In regard to the above, an effect of improving the efficiency in recovering the exhaust gas heat can be achieved.

The stacked body is composed by stacking the plurality of jacket parts each having a flattened-shape, whereby the device can be downsized despite that the long heat exchange medium conduit is provided. Further, the two jacket part assemblies are stacked on the end part having the heat exchange medium conduit provided thereinside, whereby the device can be downsized despite that the long heat exchange medium conduit is provided.

EXPLANATION OF REFERENCE NUMERALS

1 . . . exhaust pipe, 2 . . . cylindrical shell, 4 . . . exhaust gas heat recovery section, 6, 8 . . . jacket part, 10 . . . stacked body, 20 . . . heat exchange medium conduit, 22, 32, 46 . . . inflow opening, 24, 34, 48 . . . outflow opening, 36, 38 . . . jacket part assembly, 37 . . . clearance (second clearance), 58 . . . clearance (first clearance), 60 . . . clearance (third clearance), 40 . . . end part, 54 . . . inflow pipe, 56 . . . outflow pipe, 62 . . . lid member, 64 . . . diversion valve, 66 . . . bracket, 68 . . . valving element, 100 . . . exhaust gas heat recovery device

MODE FOR CARRYING OUT THE INVENTION

Hereinafter, a mode for carrying out the present invention will be described in detail with reference to the drawings.

Figure 1:
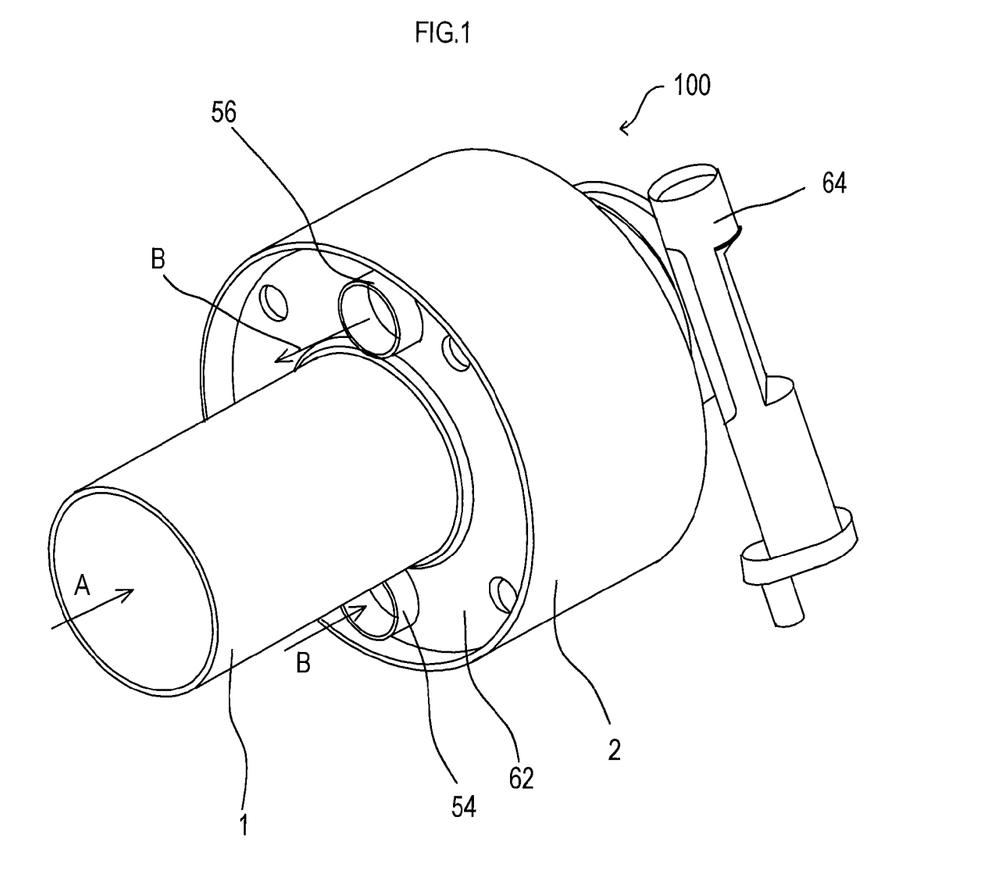
FIG. 1 is a perspective view of an exhaust gas heat recovery device as an embodiment of the present invention.
Figure 2:
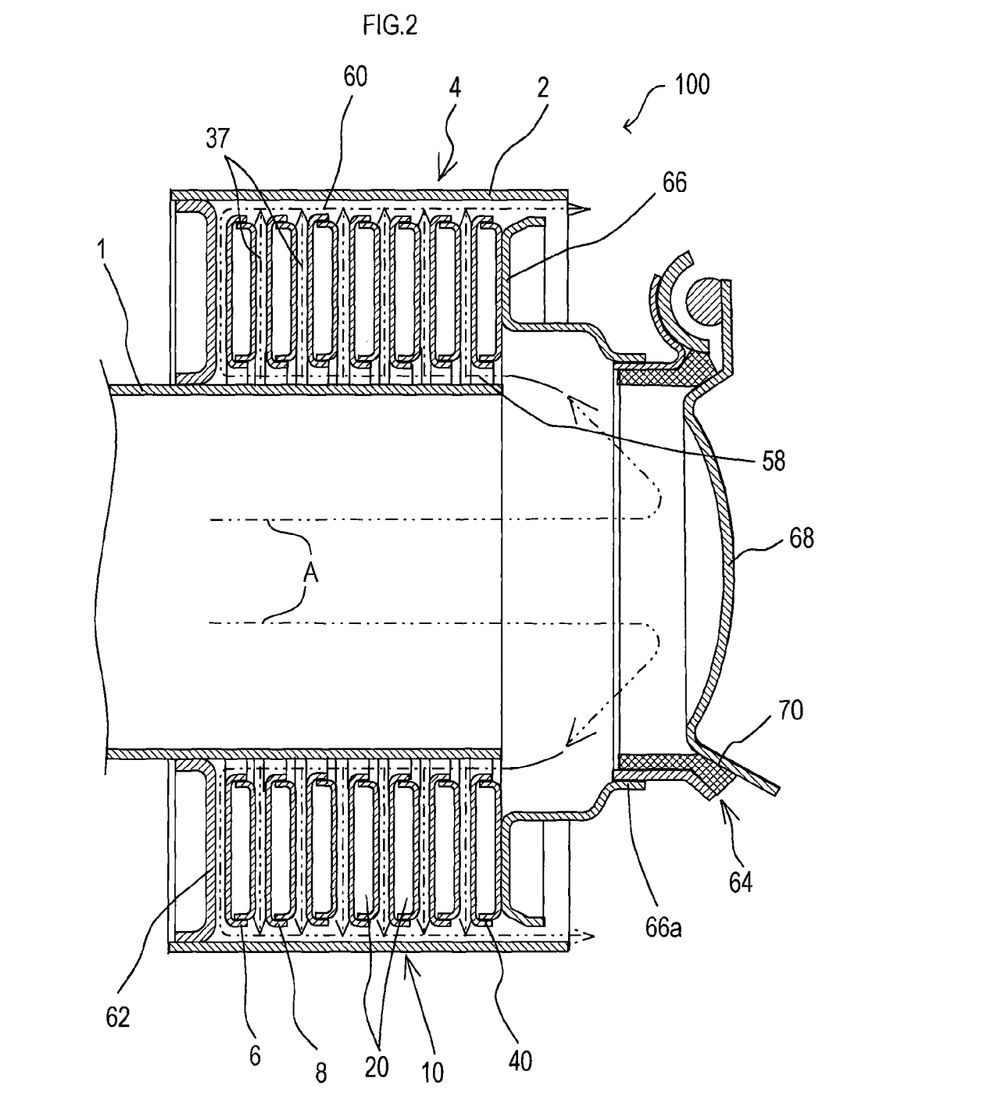
FIG. 2 is an enlarged sectional view of the exhaust gas heat recovery device according to the present embodiment.

As shown in FIGS. 1 and 2, an exhaust gas heat recovery device 100 includes an exhaust pipe 1, a cylindrical shell 2, and an exhaust gas heat recovery section 4, as main components. An upstream side of the exhaust pipe 1 is connected to an exhaust-gas flow path from an internal combustion engine, and the exhaust pipe 1 is configured such that an exhaust gas A from the internal combustion engine is led from an upstream side to a downstream side. Outside of the exhaust pipe 1, there is provided the cylindrical shell 2 that surrounds the exhaust pipe 1. The exhaust pipe 1 is disposed inside of the cylindrical shell 2, which is provided so as to be spaced from the exhaust pipe 1, whereby a space is provided between an outer circumference of the exhaust pipe 1 and an inner circumference of the cylindrical shell 2. In the present embodiment, the exhaust pipe 1 and the cylindrical shell 2 are coaxially provided.

Figure 3:
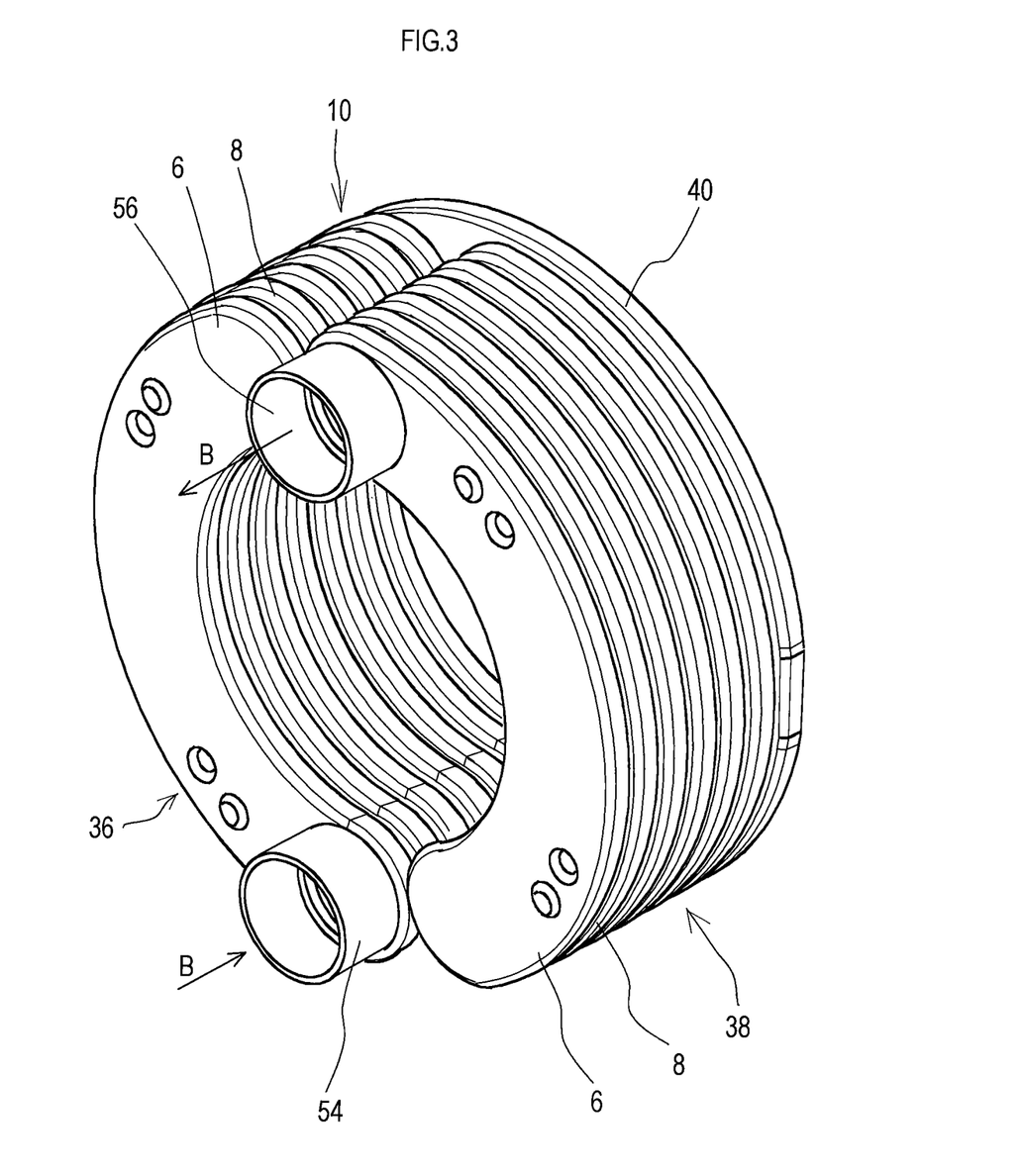
FIG. 3 is an enlarged perspective view of a stacked body according to the present embodiment.
Figure 4:
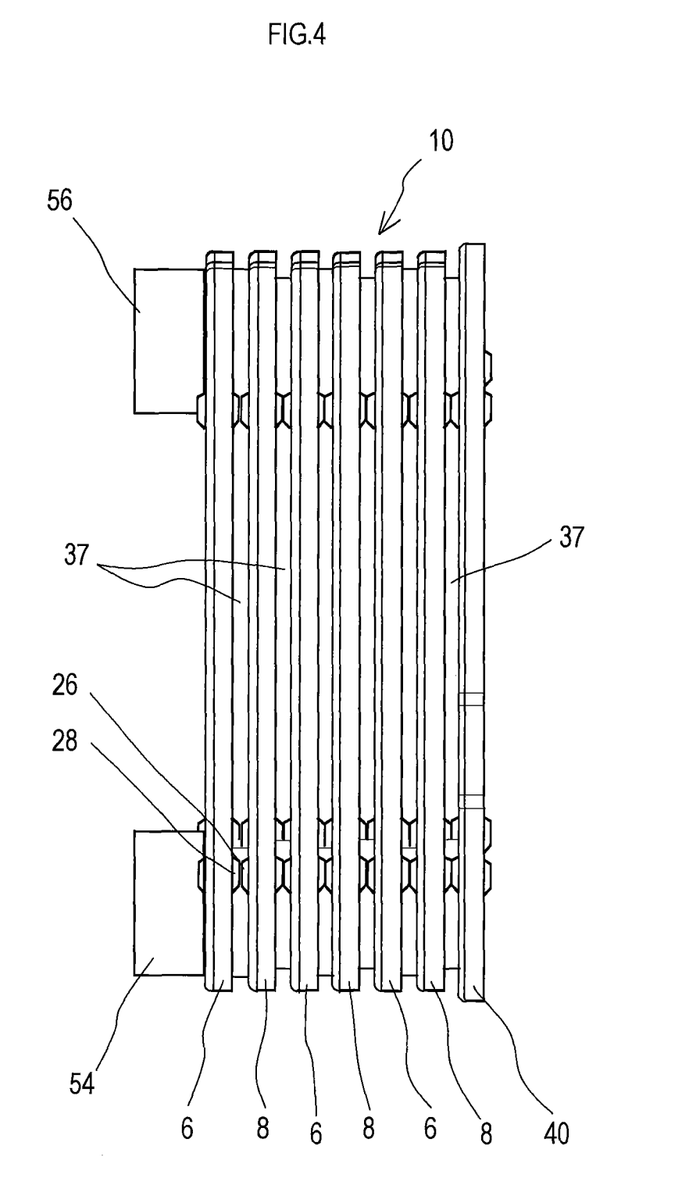
FIG. 4 is an enlarged side view of the stacked body according to the present embodiment.
Figure 6:
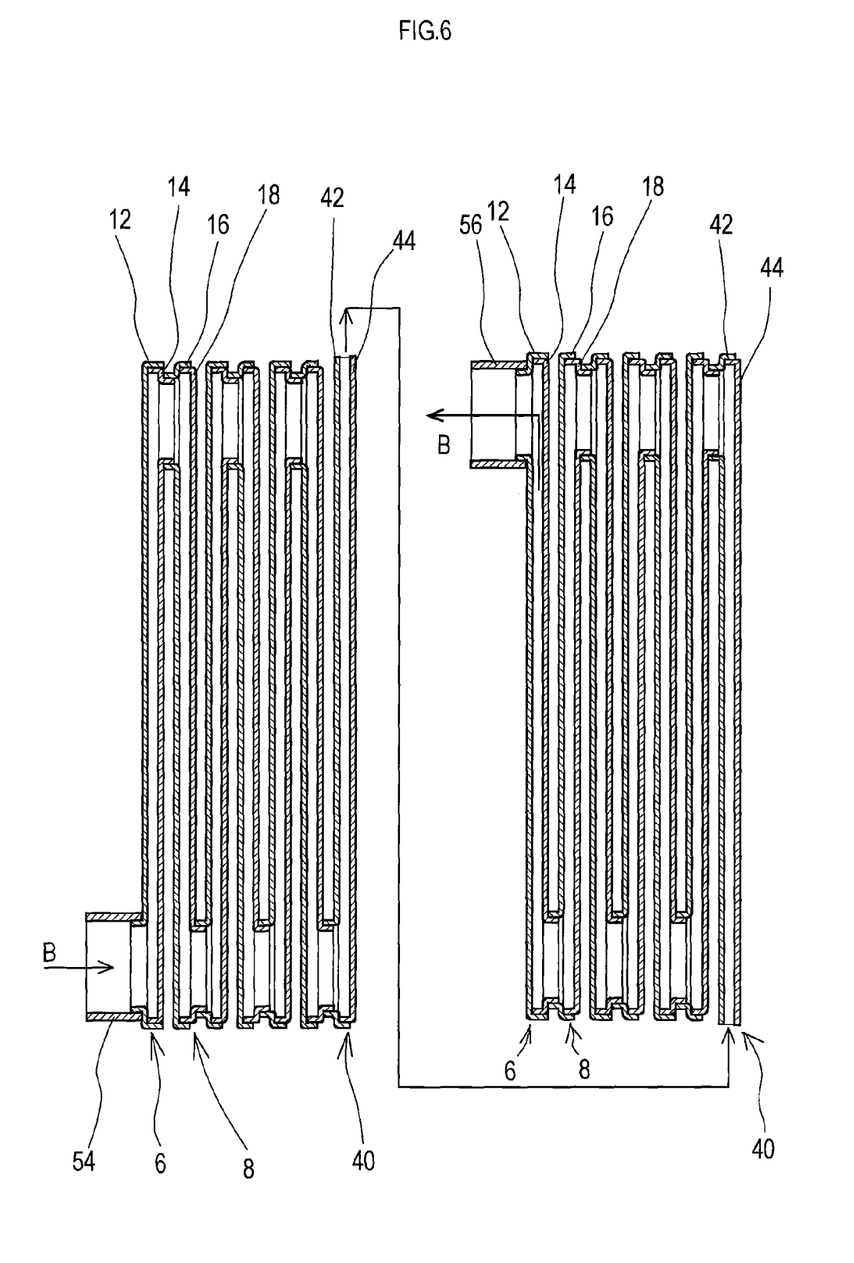
FIG. 6 is an enlarged sectional view along a heat exchange medium conduit of the stacked body according to the present embodiment.

Between the exhaust pipe 1 and the cylindrical shell 2, there is provided the exhaust gas heat recovery section 4 that performs heat exchange between the exhaust gas A and a heat exchange medium B. As shown in FIGS. 3 and 4, in the exhaust gas heat recovery section 4, there is provided a stacked body 10 composed by stacking a plurality of first and second jacket parts 6 and 8. As shown in FIG. 6, each of the first jacket parts 6 is formed by abutting a pair of half-bodies 12 and 14 to each other. As shown in FIG. 6, each of the second jacket parts 8 is similarly formed by abutting a pair of half-bodies 16 and 18 to each other.

Figure 5:
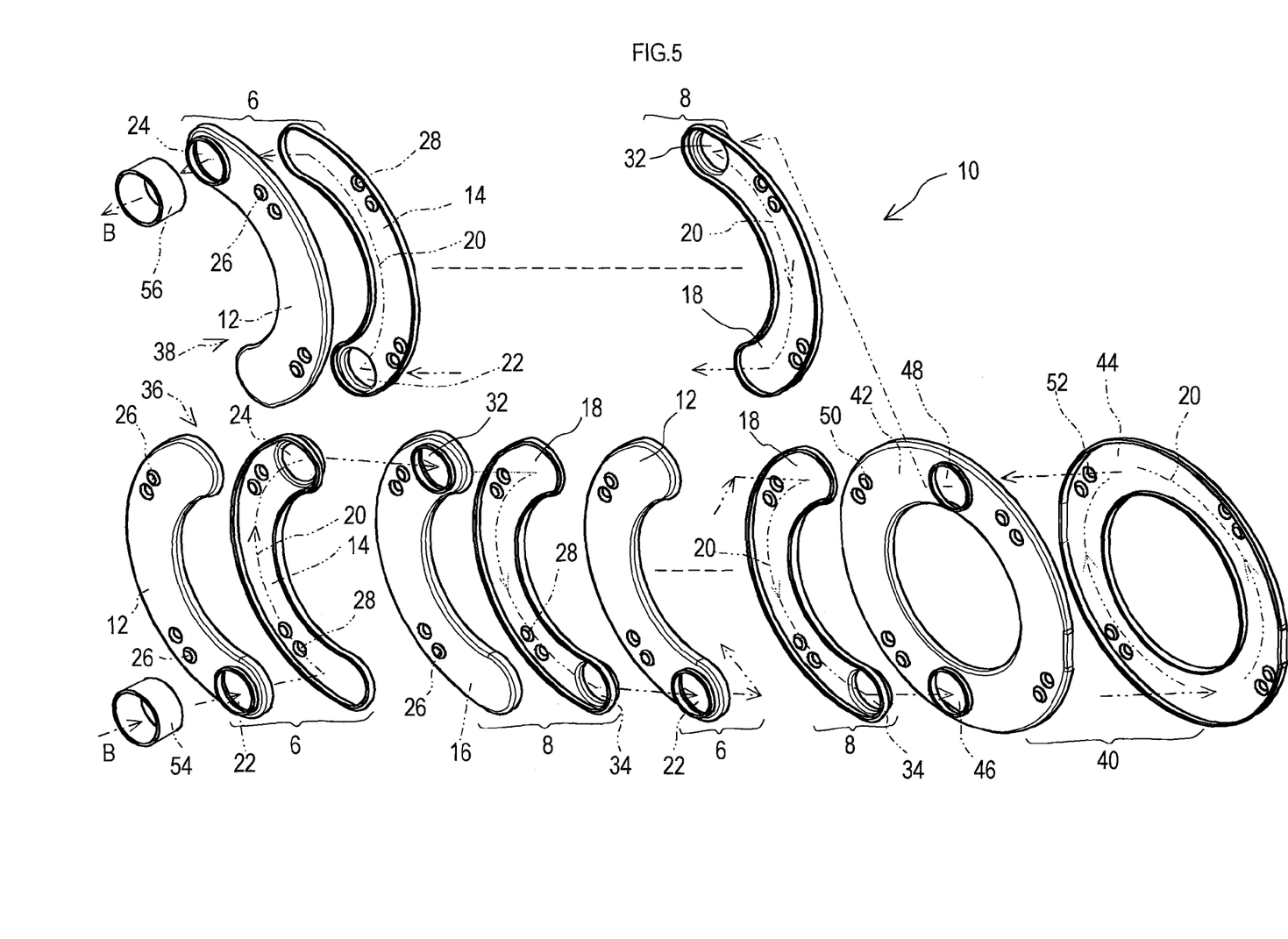
FIG. 5 is an exploded perspective view of the stacked body according to the present embodiment.

As shown in FIG. 5, each of the pair of half-bodies 12 and 14 of the first jacket part 6 has an arc-like shape, and more specifically, has a substantially half-arc-like shape in the present embodiment. In the half-bodies 12 and 14, along an entire circumference of the half body 12 as one of the pair, an edge of the half body 12 is bent toward the half body 14 as the other of the pair. Further, along an entire circumference of the half body 14, an edge of the half body 14 is bent toward the half body 12. Therefore, each of the half-bodies 12 and 14 has a recess so as to have a U-like sectional shape.

The half body 14 is configured such that overall size thereof is slightly smaller than that of the half body 12. In the pair of half-bodies 12 and 14, by facing recessed sides thereof each other and fitting the half body 14 into the half body 12, the pair of half-bodies 12 and 14 are abutted to each other. In this way, the first jacket part 6 having a flat shape is formed, and a heat exchange medium conduit 20, which is air tight, is provided inside of the first jacket parts 6.

In an end of the half body 12 having the substantially arc-like shape, there is provided, by a burring process or the like, an inflow opening 22, which communicates with the heat exchange medium conduit 20. Further, in an end of the half body 14 having the substantially arc-like shape, which end is positioned on an opposite side of the inflow opening 22 of the half body 12, there is provided an outflow opening 24 by a burring process or the like. The outflow opening 24 communicates with the heat exchange medium conduit 20. In the pair of half-bodies 12 and 14, there are respectively provided a plurality of convex portions 26 and a plurality of convex portions 28, both of which outwardly project.

The pair of half-bodies 16 and 18 of the second jacket part 8 are different from the pair of half-bodies 12 and 14 of the first jacket parts 6 in that openings corresponding to the inflow opening 22 and the outflow opening 24 respectively provided in the pair of half-bodies 12 and 14 are provided on the respective opposite ends of the substantially arc-like members, i.e., the pair of half-bodies 16 and 18. However, the configurations except the above are the same as each other. In the half body 16 as one of the pair, an inflow opening 32 is provided. In the half body 18 as the other of the pair, an outflow opening 34 is provided. The inflow opening 32 and the outflow opening 34 communicate with the heat exchange medium conduit 20 formed inside of the second jacket part 8.

The first and the second jacket parts 6 and 8 are stacked, such that the inflow opening 32 of the second jacket part 8 overlaps the outflow opening 24 of the first jacket part 6. Thus, the respective heat exchange medium conduits 20 of the first and the second jacket parts 6 and 8 are serially connected to each other. It is configured such that the heat exchange medium conduits 20 are serially connected to each other by stacking a plurality of the jacket parts 6 and 8 in such manner.

In the present embodiment, further to the above, the another first jacket part 6 is stacked on the second jacket part 8, such that the inflow opening 22 of the another first jacket part 6 overlaps the outflow opening 34 of the second jacket part 8. Yet further to the above, another second jacket part 8 is stacked on the another first jacket part 6. The stacked body 10 is configured by stacking the first and the second jacket parts 6 and 8 in such manner, and the stacked body 10 constitutes a jacket part assembly 36.

It is sufficient that the jacket part assembly 36 includes at least one first jacket part 6 and at least one second jacket part 8. However, the jacket part assembly 36 may include two first jacket parts 6 and one second jacket part 8. Alternatively, the jacket part assembly 36 may include two first jacket parts 6 and two second jacket parts 8, or more than two first and second jacket parts 6 and 8.

When the first and the second jacket parts 6 and 8 are stacked, for example, the convex portion 26 of the first jacket part 6 and a convex portion 28 of the second jacket part 8 that are adjacent contact each other, thereby providing a clearance 37 (a second clearance), through which the exhaust gas A flows, between the first jacket part 6 and the second jacket part 8, as shown in FIG. 4.

In the present embodiment, another jacket part assembly, i.e., a jacket part assembly 38, is further included. The jacket part assembly 38 includes the first and the second jacket parts 6 and 8. The jacket part assembly 38 has the same configuration as that of the above-described jacket part assembly 36. The jacket part assembly 38 is disposed on a position where the jacket part assembly 36 is rotated 180 degrees around so as to face the jacket part assembly 36. However, in the jacket part assembly 38, the inflow opening 22 and the outflow opening 24 are provided on opposite positions in regard to the jacket part assembly 36. That is, in the jacket part assembly 38, the inflow opening 22 for a heat exchange medium is provided in the half body 14 constituting the first jacket part 6, and the outflow opening 24 for the heat exchange medium is provided in another half body 12 constituting the first jacket part 6.

The stacked body 10 includes a ring-shaped end part 40 having substantially the same size as that of a shape in which two first jacket parts 6 are disposed so as to face each other. The end part 40 is configured by abutting a pair of half-bodies 42 and 44 to each other. In the half-bodies 42 and 44, along an entire circumference of the half body 42 as one of the pair, an edge of the half body 42 is bent toward the half body 44 as the other of the pair. Further, along an entire circumference of the half body 44, an edge of the half body 44 is bent toward the half body 42. Therefore, each of the half-bodies 42 and 44 has a recess so as to have a U-like sectional shape over the entire circumference.

The half body 44 is configured such that overall size thereof is slightly smaller than that of the half body 42. In the pair of half-bodies 42 and 44, by facing recessed sides thereof each other and fitting the half body 44 into the half body 42, the pair of half-bodies 42 and 44 are abutted to each other. In this way, the end part 40 having a flat shape is formed, and the heat exchange medium conduit 20, which is airtight, is provided inside of the end part 40.

In the half body 42, there is provided, by the burring process or the like, an inflow opening 46 and an outflow opening 48, which communicate with the heat exchange medium conduit 20. The inflow opening 46 and the outflow opening 48 are provided at opposite positions with respect to each other at an angle of 180 degrees. In the half-bodies 42 and 44, there are respectively provided a plurality of convex portions 50 and 52, both of which outwardly project.

The jacket part assembly 36 is stacked on one half of the end part 40, such that the outflow opening 34 of the jacket part assembly 36 overlaps the inflow opening 46 of the end part 40. The jacket part assembly 38 is stacked on the other half of the end part 40, such that the inflow opening 32 of the jacket part assembly 38 overlaps the outflow opening 48 of the end part 40. By this, the respective convex portions 28 and 50 contact each other, thereby providing a clearance 37 between the end part 40 and the jacket part assemblies 36 and 38.

Thus, the jacket part assemblies 36 and 38 are stacked on the end part 40, such that the jacket part assemblies 36 and 38 face each other. In such manner, the ring-shaped stacked body 10 is configured, as shown in FIG. 3. By stacking the jacket part assemblies 36 and 38 on the end part 40, the heat exchange medium conduit 20 in the jacket part assembly 36 and the heat exchange medium conduit 20 in the jacket part assembly 38 are serially connected to each other via the heat exchange medium conduit 20 in the end part 40.

An inflow pipe 54 is attached to the inflow opening 22 of the jacket part assembly 36 by insertion of the inflow opening 22. An outflow pipe 56 is attached to the outflow opening 24 of the jacket part assembly 38 by insertion of the outflow opening 24. Each of the half-bodies 12 and 14 of the jacket part 6, each of the half-bodies 16 and 18 of the jacket part 8, each of the half-bodies 42 and 44 of the end part 40, the inflow pipe 54, the outflow pipe 56 and so on are integrally fixed by brazing, welding, or the like.

As shown in FIG. 2, the exhaust pipe 1 is inserted into the stacked body 10, while the cylindrical shell 2 is attached to an outside of the stacked body 10 by insertion of the stacked body 10. In this configuration, a clearance 58 (a first clearance) is provided between the outer circumference of the exhaust pipe 1 and an inner circumference of the stacked body 10. Further, a clearance 60 (a third clearance) is provided between an outer circumference of the stacked body 10 and the inner circumference of the cylindrical shell 2.

A lid member 62 is attached to an upstream end of the cylindrical shell 2 by insertion of the lid member 62, while the exhaust pipe 1 is provided by penetrating through the lid member 62. The upstream end of the cylindrical shell 2 is occluded by the lid member 62. In the downstream side of the exhaust pipe 1, there is provided a diversion valve 64, which is attached to a bracket 66 mounted on an end surface of the end part 40. The bracket 66 includes a cylindrical portion 66a provided coaxially with the exhaust pipe 1. The diversion valve 64 is attached to an edge of the cylindrical portion 66a. Further, the clearance 58 around the outer circumference of the exhaust pipe 1 and an inside of the exhaust pipe 1 communicate to each other via the cylindrical portion 66a.

The diversion valve 64 includes a valving element 68 that is swingably supported. The diversion valve 64 is configured such that the exhaust gas A from the exhaust pipe 1 flows into the clearance 58 during valve-closing time, i.e., when the valving element 68 is seated on a valve seat 70. Further, the diversion valve 64 is configured such that the exhaust gas from the exhaust pipe 1 is led into the exhaust-gas flow path on the downstream side via the diversion valve 64 during valve-opening time, i.e., when the valving element 68 is spaced away from the valve seat 70. The valving element 68 may be swung by an actuator, or may be opened by exhaust pressure acting on the valving element 68.

The valving element 68 projecting toward the downstream side and having a dome-like shape is configured to reverse a flow direction of the exhaust gas A when the exhaust gas A flowing out from the exhaust pipe 1 during the valve-closing time hits against the valving element 68, such that the exhaust gas A is led into the clearance 58 (the first clearance). The exhaust gas A flowing into the clearance 58 flows through the clearance 37 (the second clearance), bypasses the diversion valve 64 from the clearance 60 (the third clearance), and flows out to the downstream side of the exhaust-gas flow path.

Next, an operation of the exhaust gas heat recovery device according to the present embodiment will be described.

When the internal combustion engine is being warmed up, the diversion valve 64 is closed by seating the valving element 68 on the valve seat 70. The heat exchange medium B, such as cooling water of the internal combustion engine and the like, is supplied into the inflow pipe 54, and the heat exchange medium B flows into the heat exchange medium conduit 20 of the jacket part assembly 36. The heat exchange medium conduit 20 is configured by serially connecting the respective heat exchange medium conduits 20 in the plurality of jacket parts 6 and 8. In this configuration, the heat exchange medium B flows through, in series, the respective heat exchange medium conduits 20 in the stacked jacket parts 6 and 8, and flows into the heat exchange medium conduit 20 in the end part 40.

The heat exchange medium B flows from the heat exchange medium conduit 20 in the end part 40 into the heat exchange medium conduit 20 in the jacket part assembly 38. The heat exchange medium conduit 20 is configured by serially connecting the respective heat exchange medium conduits 20 in the plurality of jacket parts 6 and 8. In this configuration, the heat exchange medium B flows through, in series, the heat exchange medium conduits 20 in the stacked jacket parts 6 and 8, and flows out from the outflow pipe 56 to the outside.

In a valve-closed state, when the exhaust gas A from the internal combustion engine flows into the exhaust pipe 1, the exhaust gas A hits against the valving element 68 and the flow direction of the exhaust gas A is reversed. Then, the exhaust gas A flows into the clearance 58 between the outer circumference of the exhaust pipe 1 and the inner circumference of the stacked body 10. The exhaust gas A flows outwardly in a radial direction from the clearance 58 via the clearance 37 between the jacket parts 6 and 8, and then flows into a clearance 60 between an outer circumference of a the stacked body 10 and the inner circumference of the cylindrical shell 2. Then, the exhaust gas A flows out from the clearance 60 along the inner circumference of the cylindrical shell 2 to the downstream side of the exhaust-gas flow path.

When the exhaust gas A flows through the clearance 37 between the jacket parts 6 and 8, heat exchange is performed between the exhaust gas A and the heat exchange medium B flowing through the heat exchange medium conduit 20 in each of the jacket parts 6 and 8. By this heat exchange, a temperature of the heat exchange medium B increases, and a temperature of the exhaust gas A decreases.

In the exhaust gas heat recovery device 100 according to the present embodiment, the respective heat exchange medium conduits 20 in the plurality of jacket parts 6 and 8 are serially connected to each other, whereby the heat exchange medium B flows through one long heat exchange medium conduit 20 as a whole flow path. Therefore, the heat exchange is performed between the heat exchange medium B and the exhaust gas A each time the heat exchange medium B flows through the heat exchange medium conduit 20 in each of the jacket parts 6 and 8. Thus, in the exhaust gas heat recovery device 100, an exhaust gas heat is adequately recovered and the temperature of the heat exchange medium B increases in a short time, whereby warming-up of the internal combustion engine is completed in a shorter time.

Further, in the exhaust gas heat recovery device 100, the stacked body 10 composed by stacking the plurality of jacket parts 6 and 8 is included. Therefore, the device can be downsized despite that a long heat exchange medium conduit 20 is provided.

Further, in the exhaust gas heat recovery device 100, the exhaust gas A having a high temperature from the exhaust pipe 1, first, flows into the clearance 58 between the outer circumference of the exhaust pipe 1 and the inner circumference of the stacked body 10. Therefore, it is possible to inhibit the exhaust gas heat from being released to the atmosphere, whereby a recovery loss of the exhaust gas heat amount to be recovered can be decreased.

When the diversion valve 64 is open, the exhaust gas A is discharged from the exhaust pipe 1 via the diversion valve 64 to the downstream side of the exhaust-gas flow path. Since the clearance 58 is provided between the outer circumference of the exhaust pipe 1 and the inner circumference of the stacked body 10, it is possible to inhibit the exhaust gas heat from being conducted to the heat exchange medium B in the heat exchange medium conduit 20, whereby an excessive temperature increase of the heat exchange medium B during valve-opening time can be inhibited.

Hereinbefore, one example of the embodiments of the present invention has been described. However, the present invention should not be limited to such embodiment, and can be implemented in various manners within a scope not departing from the spirit of the present invention.

The invention claimed is:

1. An exhaust gas heat recovery device that recovers heat of an exhaust gas from an internal combustion engine, comprising:
   an exhaust pipe that leads the exhaust gas from an upstream side to a downstream side;
   a cylindrical shell that covers an outside of the exhaust pipe; and
   an exhaust gas heat recovery section that is interposed between the exhaust pipe and the cylindrical shell and that performs heat exchange between the exhaust gas and a heat exchange medium,
   wherein the exhaust gas heat recovery section includes a stacked body that comprises a plurality of stacked jacket parts each having a respective heat exchange medium conduit provided thereinside and each of a half-arc shape and, in the stacked body, the respective heat exchange medium conduits in the plurality of stacked jacket parts are serially connected to each other, via a respective inflow and outflow opening provided on each stacked jacket part, at opposite ends of the half-arc shape respectively, wherein a first clearance, through which the exhaust gas from the exhaust pipe passes, is provided between an outer circumference of the exhaust pipe and the stacked body, wherein a second clearance, through which the exhaust gas passes after passage through the first clearance, is provided between the plurality of stacked jacket parts constituting the stacked body, and wherein a third clearance, through which the exhaust gas passes after passage through the second clearance, is provided between an inner circumference of the cylindrical shell and the stacked body.

2. The exhaust gas heat recovery device according to claim 1,
wherein each jacket part of the plurality of stacked jacket parts further comprises a flattened shape.

3. The exhaust gas heat recovery device according to claim 2, further comprising:
an end part having a heat exchange medium conduit of a ring shape provided thereinside,
wherein the stacked body comprises two jacket part assemblies each including multiple jacket parts of the plurality of stacked jacket parts,
wherein the two jacket part assemblies are disposed on the end part, such that the two jacket part assemblies face each other, and
wherein respective heat exchange medium conduits in the two jacket part assemblies are serially connected to each other via the heat exchange medium conduit in the end part.

4. The exhaust gas heat recovery device according to claim 1,
wherein each jacket part of the plurality of stacked jacket parts has two half-bodies, and the heat exchange medium conduit is provided inside of each jacket part of the plurality of stacked jacket parts by abutting the two half-bodies to each other.

5. The exhaust gas heat recovery device according to claim 1, further comprising:
a diversion valve arranged to lead the exhaust gas to the exhaust gas heat recovery section when the internal combustion engine is being warmed up,
wherein the diversion valve includes a domed-shaped valving element, and the diversion valve is arranged to cause the exhaust gas flowing out from the exhaust pipe to hit against the valving element and flow into the first clearance.

* * * * *